(12) United States Patent
Kimura et al.

(10) Patent No.: US 8,132,847 B2
(45) Date of Patent: Mar. 13, 2012

(54) GARNISH FOR VEHICLE, HAVING U-SHAPED RECESSED PORTION, WHICH IS INTEGRALLY FORMED ALONG EDGE IN LONGITUDINAL DIRECTION

(75) Inventors: Yosuke Kimura, Utsunomiya (JP); Tomofumi Ichinose, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 12/441,456

(22) PCT Filed: Sep. 18, 2007

(86) PCT No.: PCT/JP2007/068094
§ 371 (c)(1),
(2), (4) Date: Mar. 16, 2009

(87) PCT Pub. No.: WO2008/041475
PCT Pub. Date: Apr. 10, 2008

(65) Prior Publication Data
US 2009/0243341 A1    Oct. 1, 2009

(30) Foreign Application Priority Data
Sep. 27, 2006    (JP) .................................. 2006-262041

(51) Int. Cl.
*B60J 10/08*    (2006.01)
(52) U.S. Cl. ..................... 296/146.9; 296/146.1; 49/501
(58) Field of Classification Search .................. 296/209, 296/199, 202, 193.07, 191, 187.08, 146.9, 296/207, 1.08, 146.1; 49/502, 501
See application file for complete search history.

(56) References Cited

U.S. PATENT DOCUMENTS

| | | | | |
|---|---|---|---|---|
| 4,721,642 A | * | 1/1988 | Yoshimi et al. | ................ 428/90 |
| 6,095,591 A | * | 8/2000 | Matsuyama et al. | ..... 296/187.05 |
| 6,435,601 B2 | * | 8/2002 | Takahara | ................ 296/187.03 |
| 7,168,757 B2 | * | 1/2007 | Futatsuhashi | ................ 296/209 |
| 2005/0166460 A1 | * | 8/2005 | Watanabe et al. | ............... 49/415 |
| 2006/0107601 A1 | * | 5/2006 | Inagaki et al. | ................. 49/441 |
| 2007/0006534 A1 | * | 1/2007 | Hiramatsu et al. | ............. 49/414 |
| 2007/0180776 A1 | * | 8/2007 | Oba et al. | .................... 49/498.1 |

FOREIGN PATENT DOCUMENTS

| | | |
|---|---|---|
| DE | 4102302 A1 | 7/1992 |
| DE | 20207098 U1 | 9/2003 |
| FR | 2703125 | 9/1994 |
| JP | 59-156841 | 10/1984 |

(Continued)

*Primary Examiner* — Lori Lyjak
(74) *Attorney, Agent, or Firm* — Rankin, Hill & Clark LLP

(57) ABSTRACT

A garnish for a vehicle, which has a long form made of a resin material, and is attached to a member of the body of the vehicle. A recessed portion having a substantially U-shaped section is integrally formed at an edge of a main body of the garnish in the longitudinal direction thereof, and continuously formed along the length of the main body. Typically, the edge of the main body in the longitudinal direction is attached to the body of the vehicle substantially horizontally; and the recessed portion is formed at the upper edge of the main body of the garnish when the main body is attached to the body of the vehicle. Preferably, the recessed portion has a bottom wall, which has a thin part having a smaller thickness in comparison with the other parts of the recessed portion.

14 Claims, 4 Drawing Sheets

FOREIGN PATENT DOCUMENTS

| | | |
|---|---|---|
| JP | 61-41052 | 3/1986 |
| JP | 61-78751 | 5/1986 |
| JP | 63-79244 | 5/1988 |
| JP | 4-64115 | 6/1992 |
| JP | 06-298010 | 10/1994 |
| JP | 2005-119459 | 5/2005 |

* cited by examiner

GARNISH FOR VEHICLE, HAVING
U-SHAPED RECESSED PORTION, WHICH IS
INTEGRALLY FORMED ALONG EDGE IN
LONGITUDINAL DIRECTION

TECHNICAL FIELD

The present invention relates to a garnish for a vehicle, which is made of resin, has a long form, and is attached to a member of the vehicle body (i.e., a vehicle body member) such as a back door.

Priority is claimed on Japanese Patent Application No. 2006-262041, filed Sep. 27, 2006, the content of which is incorporated herein by reference.

BACKGROUND ART

A garnish made of resin, which may be attached to a back door of a vehicle, is attached to a panel of a door main body (i.e., a vehicle body member) by using screws or the like. It is known that when such a garnish has a long form, an edge (or an end edge) of the garnish in the longitudinal direction tends to droop, wave, or the like, due to an influence of heat.

As a technique for solving this problem, a garnish for a vehicle has been proposed in which a reinforcing member made of metal is applied to the back side of an edge of the main body of the garnish, along the longitudinal direction, and the garnish main body is attached to the vehicle body member together with the reinforcing member (see, for example, Patent Document 1).

Patent Document 1: Japanese Unexamined Patent Application, First Publication No. 2005-119459.

However, in the above-described conventional garnish for a vehicle, a reinforcing member made of metal, which has a high rigidity and is not relatively less affected by heat, should be provided as a separate member, which causes increases in the number of parts and in the weight. This has been a problem to be solved.

DISCLOSURE OF INVENTION

In light of the above circumstances, an object of the present invention is to provide a garnish for a vehicle, which does not cause increases in the number of parts and in the weight, and reliably prevents an edge of the garnish from being distorted or deformed.

Therefore, the present invention provides a garnish (e.g., a lower garnish 2 in an embodiment explained later) for a vehicle, which has a long form made of a resin material, and is attached to a member of the body of the vehicle, wherein:

a recessed portion (e.g., a recessed portion 15 in the embodiment) having a substantially U-shaped section is integrally formed at an edge of a main body (e.g., a garnish main body 8 in the embodiment) of the garnish in the longitudinal direction thereof, and continuously formed along the length of the main body.

In accordance with the above structure, at the edge of the main body of the garnish in the longitudinal direction thereof, double walls (which extend substantially in parallel to each other) in the recessed portion mutually reinforce each other.

In a typical example:
the edge of the main body in the longitudinal direction is attached to the body of the vehicle substantially horizontally; and
the recessed portion is formed at the upper edge of the main body of the garnish when the main body is attached to the body of the vehicle.

Accordingly, thermal deformation of the upper side of the main body of the garnish, which tends to droop or wave due to gravity, is prevented.

In a preferable example, the recessed portion has a bottom wall, which has a thin part (e.g., a thin part 16 in the embodiment) having a smaller thickness in comparison with the other parts of the recessed portion.

Accordingly, the volume of the material in the bottom wall of the recessed portion is reduced, thereby preventing shrinkage from appearing on a side face (toward the outside of the vehicle) of the main body of the garnish when the garnish is formed.

In another preferable example:
the recessed portion is formed in a manner such that it is open toward the edge of the main body of the garnish; and
a sealing member (e.g., a sealing member 19 in the embodiment) for sealing a gap between the main body and another member (e.g., a door main-body panel 5 in the embodiment) adjacent thereto is provided so as to stretch over the open end of the recessed portion.

Accordingly, the sealing member covers the open end of the recessed portion, and is provided in a substantially flat form at the relevant edge of the main body of the garnish.

In another typical example, the recessed portion has a wall to which another part (e.g., a switch case 13 in the embodiment) to be attached to the main body is fit and fastened.

In this case, said another part is strongly supported at the recessed portion having a high rigidity.

In accordance with the present invention, rigidity of an edge of the garnish main body in the longitudinal direction is reliably improved by a recessed portion which is integrally formed. Therefore, distortion or deformation of the edge of the garnish main body can be reliably prevented without causing increases in the number of parts and in the weight.

In accordance with the above typical example, the main body of the garnish extends substantially horizontally. Therefore, in the garnish in which the upper side thereof tends to droop or wave due to gravity, deformation of the upper edge can be reliably prevented by means of the recessed portion, thereby improving the quality of outward appearance of the vehicle.

In accordance with the above preferable example, the thin part is provided at the bottom wall of the recessed portion, thereby preventing shrinkage from appearing on a side face (toward the outside of the vehicle) of the main body of the garnish when the garnish is formed. Therefore, it is possible to further improve the quality of the outward appearance with respect to the vehicle.

In accordance with said another preferable example, the sealing member is provided so as to stretch over the open end of the recessed portion, thus in a substantially flat form with respect to the end faces of the main body of the garnish. Therefore, the sealing member can stably contact said another member, thereby improving sealing capability between the garnish and said another member.

In accordance with said another typical example, as said another part is fit and fastened to a wall of the recessed portion having a high rigidity, it can be strongly and stably supported at the garnish.

BEST MODE FOR CARRYING OUT THE INVENTION

Below, an embodiment in accordance with the present invention will be explained with reference to the drawings. In the following explanation, adjectives "upper" and "lower" with respect to a back door 4 respectively indicate upper and lower parts when the back door 4 is closed.

Figure 1:
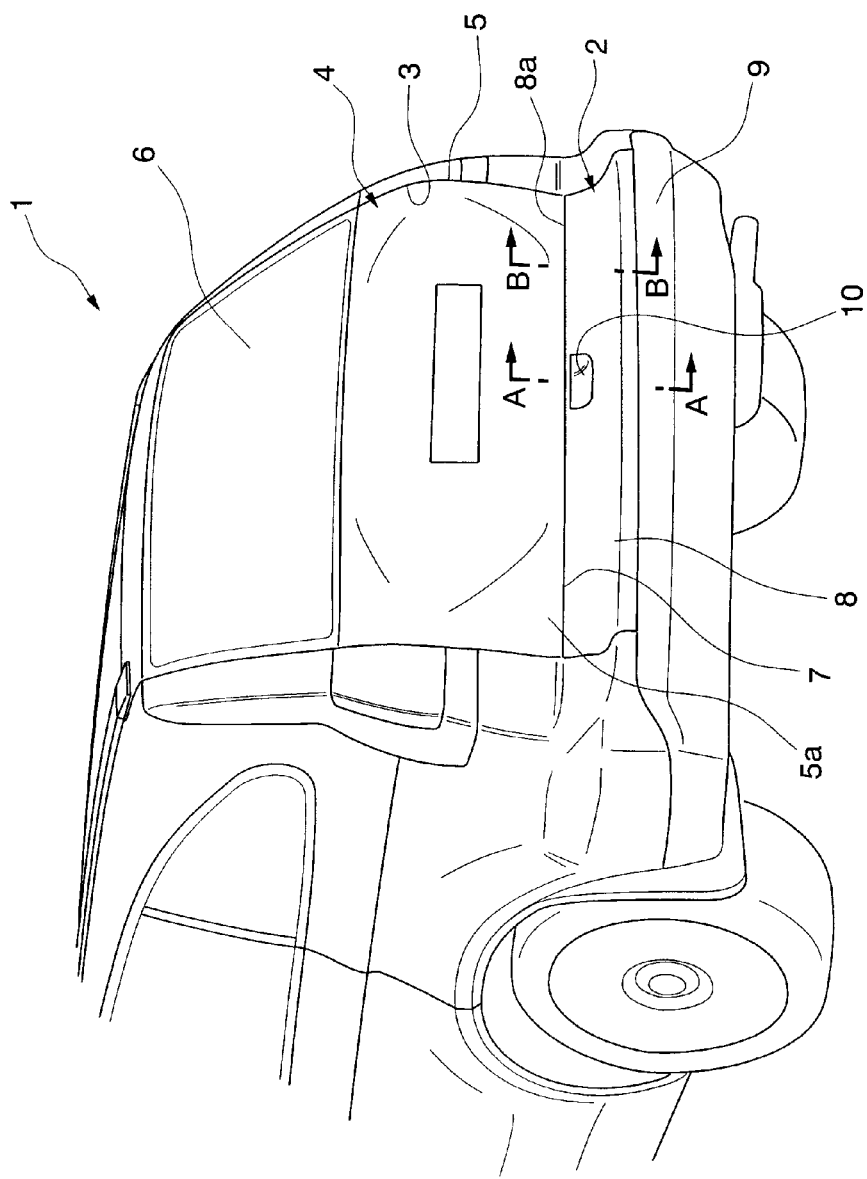
FIG. 1 is a perspective view of a vehicle, observed from the back side thereof, in an embodiment in accordance with the present invention.

In FIG. 1, reference numeral 1 indicates a vehicle to which a garnish (i.e., a lower garnish 2) in accordance with the present invention is applied. At the back side of the vehicle 1, a door opening 3 is provided, and the back door 4 (i.e., a tail gate) is attached to the upper side of the door opening 3 via a hinge (not shown) in a manner such that it can be opened and closed in the vertical direction.

In the back door 4, a door windowpane 6 is attached to the upper side (which faces the outside of the vehicle) of a door main-body panel 5 (as "another member" of the present invention) made of a steel plate, and the lower garnish 2 made of resin is attached to the lower edge of the door main-body panel 5 in the width direction of the vehicle. The lower garnish 2 has a long form along the width direction of the vehicle, and also has a form which almost coincides with the lower form of the door opening 3.

Figure 2:
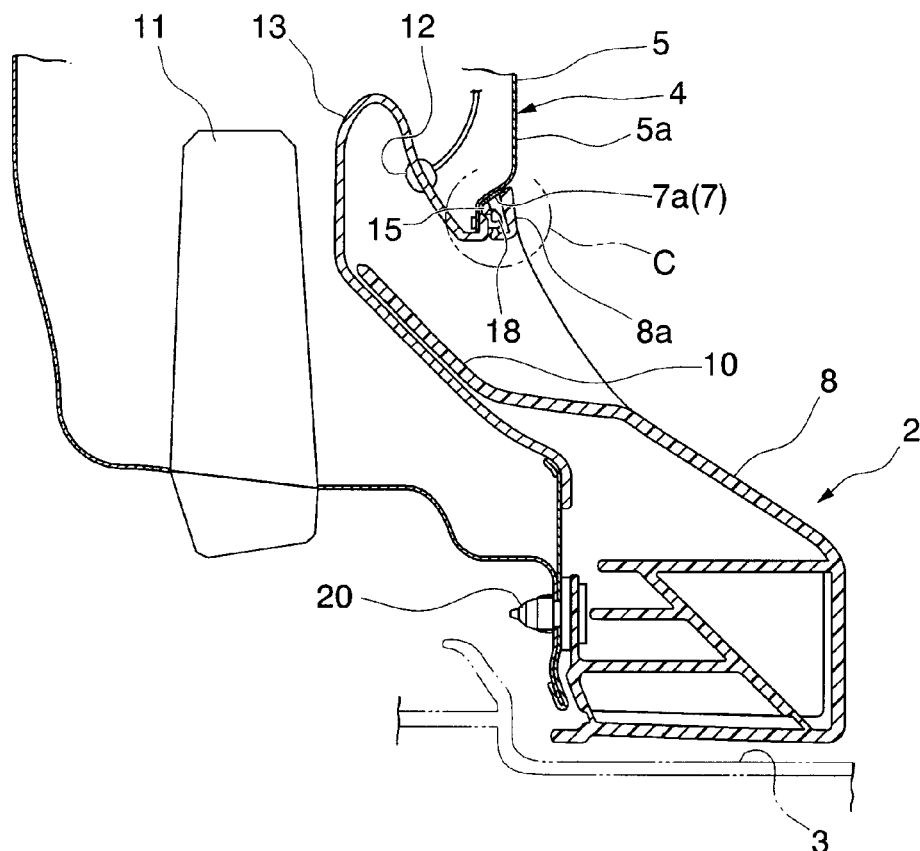
FIG. 2 is an enlarged sectional view along line A-A in FIG. 1.

FIG. 2 is an enlarged sectional view along line A-A in FIG. 1. As shown in FIG. 2, the lower edge (toward the outside of the vehicle) of the door main-body panel 5 has a step part 7, which is recessed toward the interior of the vehicle, and is arranged along the width of the vehicle. The lower garnish 2 is attached to the step part 7. The upper wall 7a of the step part 7 extends substantially horizontally along the width of the vehicle.

The lower garnish 2 has a garnish main body 8, whose upper edge 8a along the width of the vehicle forms almost the same plane together with a general surface 5a (facing the outside of the vehicle) of the door main-body panel 5. In addition, the garnish main body 8 protrudes toward the back side of the vehicle so that a part from the upper edge 8a to the lower side of the garnish main body 8 joins a bumper fascia 9 (see FIG. 1).

In addition, a recessed part 10, into which an operator inserts a hand when opening the back door 4, is formed immediately below the upper edge 8a of the garnish main body 8, and at substantially the center in the width of the vehicle. The upper side of the recessed part 10 is open, and a lock release switch 12 for a door lock mechanism 11 is arranged in this open area. To the back side of the recessed part 10 in the garnish main body 8, a switch case 13 (as "another part" of the present invention) for supporting the lock release switch 12 and a switch circuit (not shown) is attached.

Figure 3:
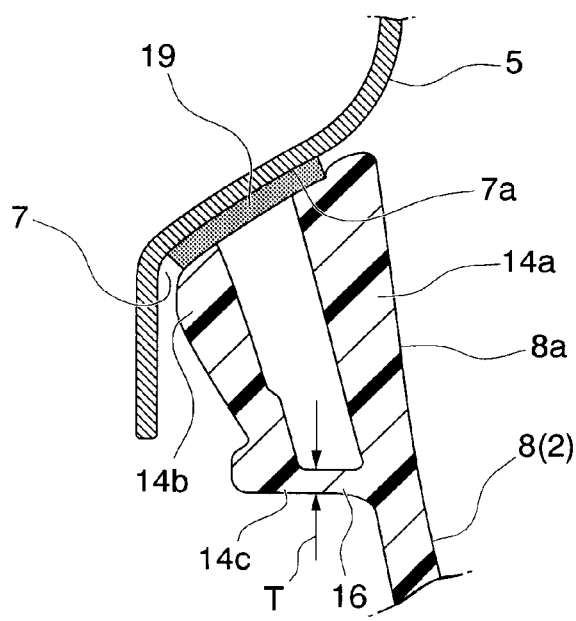
FIG. 3 is an enlarged sectional view along line B-B in FIG. 1.

FIG. 3 is an enlarged sectional view along line B-B in FIG. 1. With reference to FIG. 3 together with FIG. 2, in the upper edge 8a of the garnish main body 8, a reinforcing wall 14b is integrally provided at the back side of an outer wall 14a (toward the outside of the vehicle) which joins the general wall 5a of the door main-body panel 5, where the reinforcing wall 14b extends substantially parallel to the outer wall 14a, and a bottom wall 14c is also integrally provided so as to connect the outer wall 14a with the reinforcing wall 14b. A recessed portion 15, which has a substantially U-shaped section and is open toward the upper side, is formed by the outer wall 14a, the reinforcing wall 14b, and the bottom wall 14c. The recessed portion 15 is continuously formed along the length of the garnish main body 8. Additionally, as shown in FIG. 3, the bottom wall 14c (of the recessed portion 15) for connecting the outer wall 14a with the reinforcing wall 14b has a thin part 16 having a smaller thickness T in comparison with the outer wall 14a and the reinforcing wall 14b.

Figure 4:
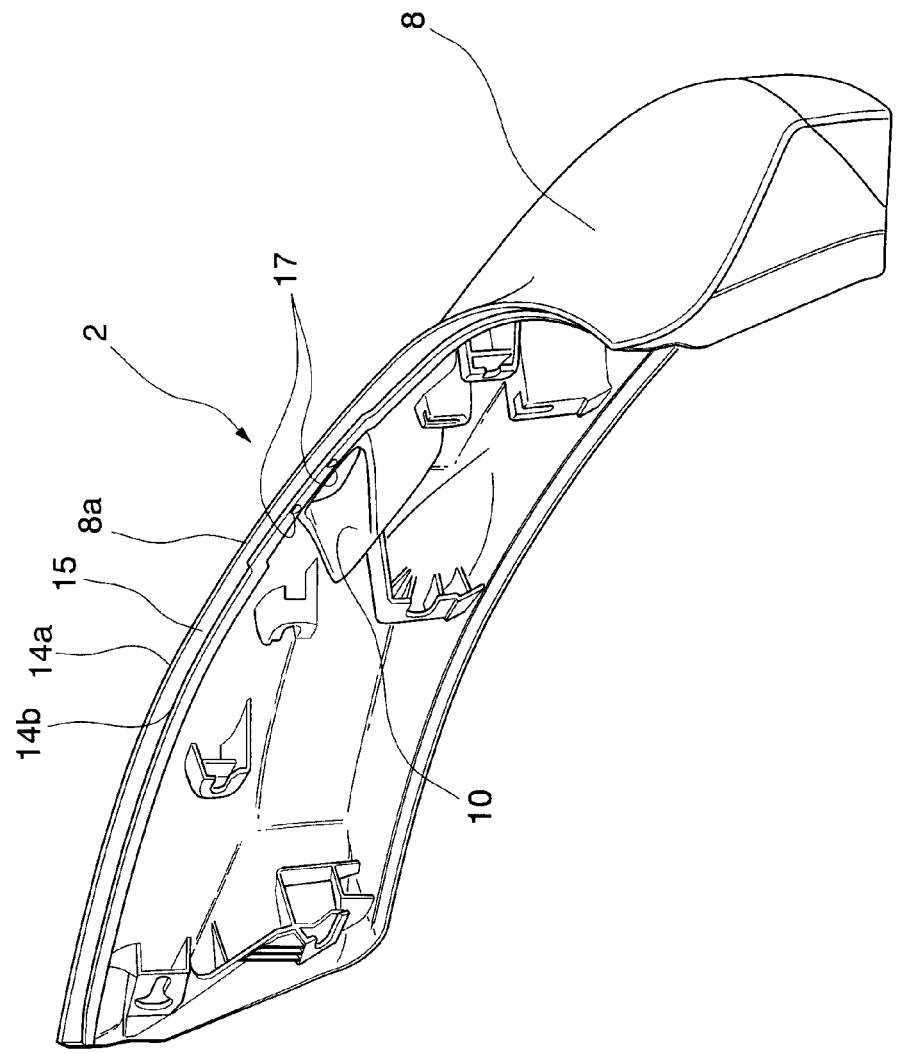
FIG. 4 is a perspective view of a lower garnish in the embodiment, observed from the back side thereof.
Figure 5:
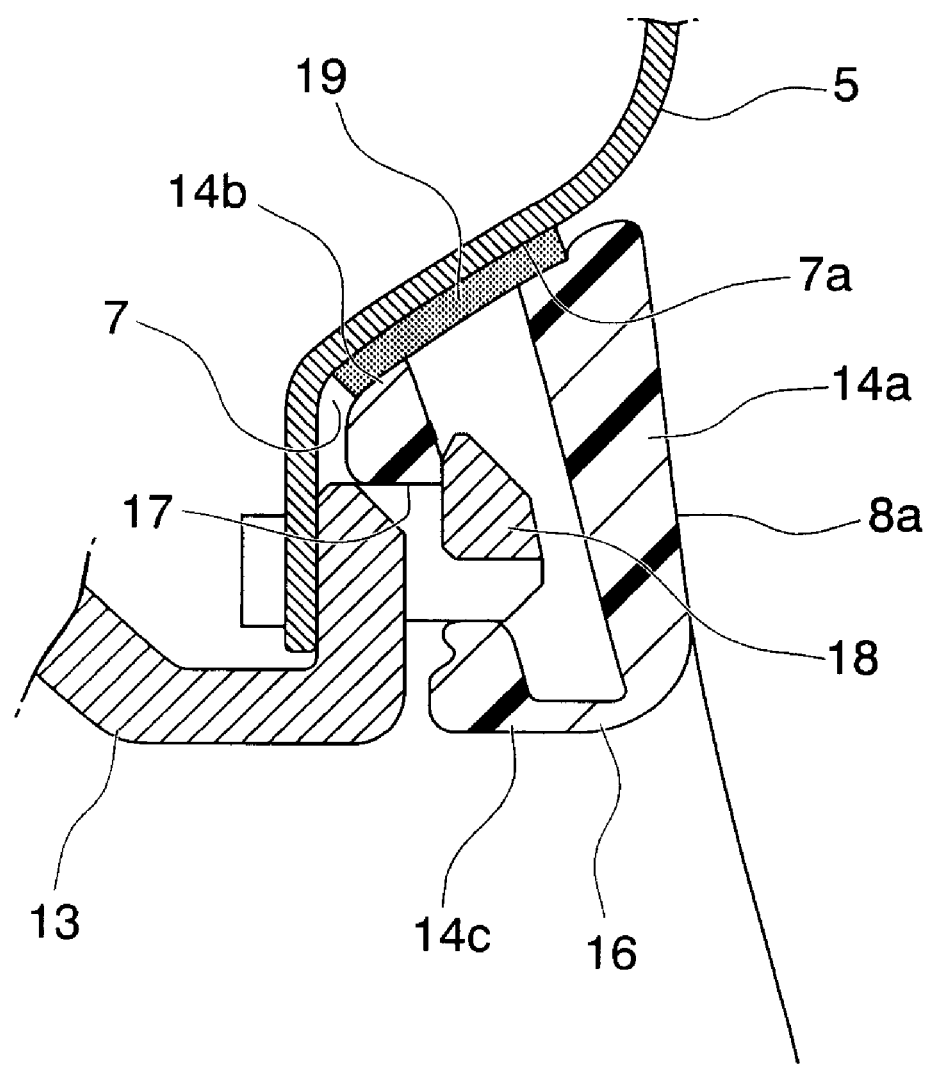
FIG. 5 is an enlarged sectional view of part C in FIG. 2.

FIG. 4 is a perspective view of the lower garnish of the present embodiment, observed from the back side thereof. FIG. 5 is an enlarged sectional view of part C in FIG. 2. In the reinforcing wall 14b which forms the recessed portion 15, fittable holes 17, which pass through the reinforcing wall 14b in the thickness direction thereof, are formed at positions which face the recessed part 10. To the fittable holes 17, fittable protrusions 18 of the switch case 13 are fit and fastened.

As shown in FIGS. 3 and 5, a sealing member 19 having a strip shape is attached to upper end faces of the recessed portion 15. That is, the sealing member 19 is attached to the end faces of the recessed portion 15 so that it stretches over the outer wall 14a and the reinforcing wall 14b of the recessed portion 15. In the state in which the lower garnish 2 is attached to the back door 4, the sealing member 19 closely contacts the upper wall 7a of the step part 7 in the door main-body panel 5.

After the switch case 12 is fit and fastened to the back face of the garnish main body 8, the lower garnish 2 is attached to the lower edge of the door main-body panel 5 by using clips 20 (see FIG. 2), bolts (not shown), and nuts (not shown).

In the lower garnish 2 attached to the door main-body panel 5 as described above, the recessed portion 15 is integrally formed at the upper edge 8a of the garnish main body 8, and continuously along the width of the vehicle. Therefore, the upper edge 8a is mutually reinforced by the outer wall 14a and the reinforcing wall 14b of the recessed portion 15, thereby improving the rigidity of the whole upper edge 8a. Accordingly, when employing the lower garnish 2, distortion or deformation of the upper edge 8a in the garnish main body 8 due to heat or the like can be reliably prevented without providing a separate reinforcing member. In particular, in the lower garnish 2 in which the upper edge 8a extends substantially horizontally (as in the present embodiment), it may also be influenced by gravity or the like, and the upper edge 8a tends to be deformed (i.e., to droop or wave). However, such a deformation can be effectively prevented by the recessed portion 15.

Therefore, when employing the lower garnish 2, deformation of the upper edge 8a can be reliably prevented without causing increases in the number of parts and the weight. Accordingly, it is possible to reliably improve the quality of outward appearance while reducing the manufacturing cost and the weight.

Additionally, in the lower garnish 2 of the present embodiment, the thin part 16 is provided in the bottom wall 14c of the recessed portion 15, and thus the volume of the material in the connection part between the outer wall 14a and the bottom wall 14c is reduced. Therefore, it is possible to prevent shrinkage (a thin part produced by a tensile tension which is applied from a thicker part) from appearing, thereby further improving the quality of the outward appearance.

Also in accordance with the present embodiment, the sealing member 19 for sealing the gap between the upper edge 8a of the lower garnish 2 and the door main-body panel 5 is attached to the end faces of the outer wall 14a and the reinforcing wall 14b in the lower garnish 2 so as to stretch over the opening of the recessed portion 15. Therefore, the sealing member 19 can be stably applied to the door main-body panel 5 while the center part of the sealing member is flat. Therefore, sealing capability can be improved, and the quality of the outward appearance can be further improved.

Also in the present embodiment, the fittable holes 17 are formed in the reinforcing wall 14b of the recessed portion 15 in the lower garnish 2, and the switch case 13 is fastened to the upper edge 8a of the lower garnish 2 by fitting the fittable protrusions 18 of the switch case 13 to the fittable holes 17. As the upper edge 8a has a high rigidity by the recessed portion 15 as described above, the switch case 13 can be strongly and stably supported by the lower garnish 2.

The present invention is not limited to the above embodiment, and various design modifications are possible within the scope of the present invention. For example, although the lower garnish 2 attached to the back door 4 has been explained, the present invention may be applied to a garnish attached to a vehicle body member other than the back door.

INDUSTRIAL APPLICABILITY

In accordance with the present invention, rigidity of an edge of the garnish main body in the longitudinal direction is reliably improved by a recessed portion which is integrally formed. Therefore, distortion or deformation of the edge of the garnish main body can be reliably prevented without causing increases in the number of parts and in the weight.

The invention claimed is:
1. A garnish for a vehicle, comprising:
a long form made of a resin material and attached to a member of a body of the vehicle, wherein:
a recessed portion having a substantially U-shaped section is integrally formed at an edge of a main body of the garnish in a longitudinal direction thereof, and continuously formed along a length of the main body, the recessed portion including a bottom wall with a thin part having a smaller thickness in comparison with other parts of the recessed portion.
2. The garnish in accordance with claim 1, wherein:
the edge of the main body in the longitudinal direction is attached to the body of the vehicle substantially horizontally; and
the recessed portion is formed at an upper edge of the main body of the garnish when the main body is attached to the body of the vehicle.
3. The garnish in accordance with claim 1, wherein:
the recessed portion is formed in a manner such that the recessed portion is open toward the edge of the main body of the garnish; and
a sealing member for sealing a gap between the main body and another member adjacent thereto is provided so as to stretch over an open end of the recessed portion.
4. The garnish in accordance with claim 1, wherein:
the recessed portion has a wall to which another part to be attached to the main body is fit and fastened.
5. The garnish in accordance with claim 1, wherein:
the recessed portion is formed by:
an outer wall which joins a surface of another member adjacent to the main body of the garnish, where the outer wall and said surface face an outside of the vehicle;
a reinforcing wall which extends substantially parallel to the outer wall; and
a bottom wall which connects the outer wall and the reinforcing wall with each other.
6. The garnish in accordance with claim 5, wherein:
in a sectional shape of the recessed portion, the outer wall and the reinforcing wall are longer than the bottom wall.
7. The garnish in accordance with claim 1, wherein:
an open end of the recessed portion is formed in a manner such that the recessed portion fits to a shape of another member adjacent to the open end.

8. The garnish in accordance with claim 1, wherein:
the member of the body of the vehicle is a back door; and
a recessed part, into which an operator inserts a hand when opening the back door, is formed immediately below the edge of the main body of the garnish.
9. The garnish in accordance with claim 5, wherein:
a recessed part which is recessed toward an interior of the vehicle is formed immediately below the edge of the main body of the garnish;
an upper side of the recessed part is open to form an open area above the recessed part; and
the reinforcing wall of the recessed portion functions as an edge of the open area, which is toward the outside of the vehicle.
10. The garnish in accordance with claim 9, wherein:
the member of the body of the vehicle is an opening and closing member;
an operator inserts a hand into the recessed part when opening the opening and closing member; and
a switch case is provided at the open area, and a lock release switch of a lock mechanism for the opening and closing member is provided in the switch case.
11. The garnish in accordance with claim 10, wherein:
the switch case has a bottom wall which forms almost a same plane together with the bottom wall of the recessed portion.
12. The garnish in accordance with claim 2, wherein:
the recessed portion is formed so that the recessed portion is open upward, and a sealing member is provided so as to stretch over an open end of the recessed portion;
the upper edge of the main body of the garnish in the longitudinal direction thereof is formed almost a same plane together with an outer surface of the body of the vehicle; and
the upper edge of the main body of the garnish in the longitudinal direction thereof is attached in a closely contact manner via a sealing member to a step part which is formed on the outer surface of the body of the vehicle and is recessed toward an interior of the vehicle.
13. A garnish for a vehicle, comprising:
a long form made of a resin material and attached to a member of a body of the vehicle, wherein:
a recessed portion having a substantially U-shaped section is integrally formed at an edge of a main body of the garnish in a longitudinal direction thereof, and continuously formed along a length of the main body, and wherein:
the recessed portion is formed in a manner such that the recessed portion is open toward the edge of the main body of the garnish; and
a sealing member for sealing a gap between the main body and another member adjacent thereto is provided so as to stretch over an open end of the recessed portion.
14. A garnish for a vehicle, comprising:
a long form made of a resin material and attached to a member of a body of the vehicle, wherein:
a recessed portion having a substantially U-shaped section is integrally formed at an edge of a main body of the garnish in a longitudinal direction thereof, and continuously formed along a length of the main body, and wherein:
the member of the body of the vehicle is a back door; and
a recessed part, into which an operator inserts a hand when opening the back door, is formed immediately below the edge of the main body of the garnish.

* * * * *